June 12, 1956
G. R. G. GATES
2,749,774
CONTROLLING SYSTEM FOR CLUTCH-OPERATED
VEHICLE STEERING MECHANISM
Filed June 27, 1952
4 Sheets-Sheet 1
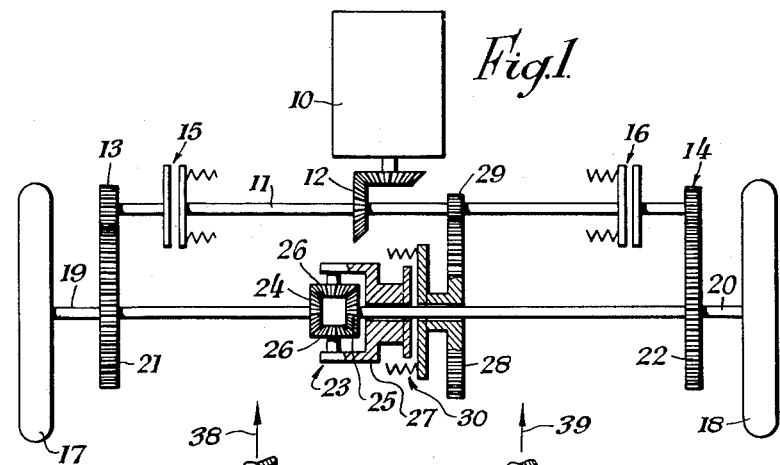
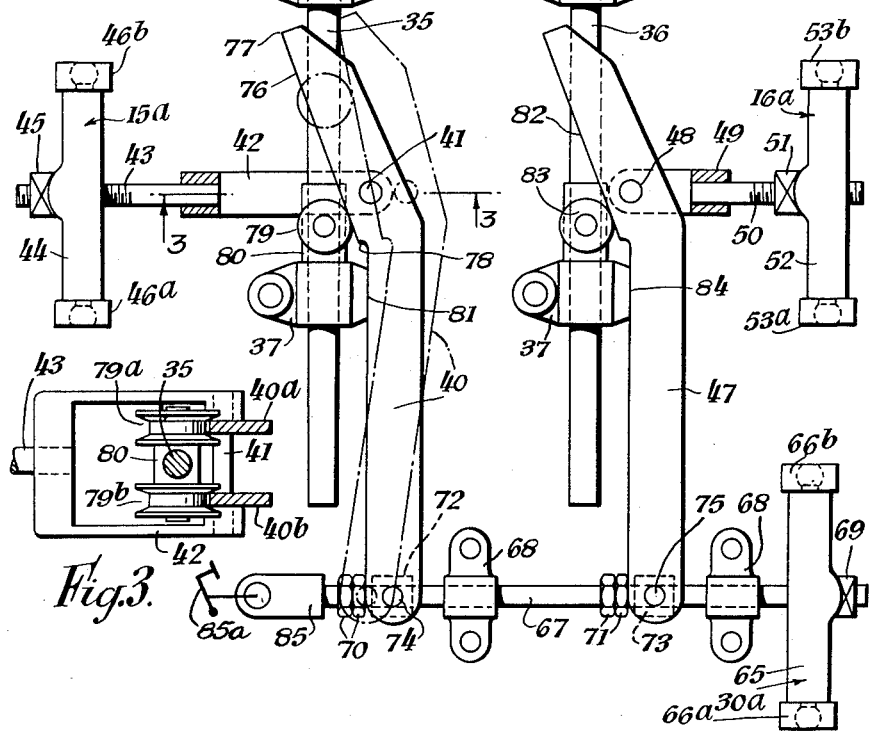
INVENTOR
Geoffrey Robert Greenberg Gates
BY
Stevens, Davis, Miller & Mosher
his ATTORNEYS

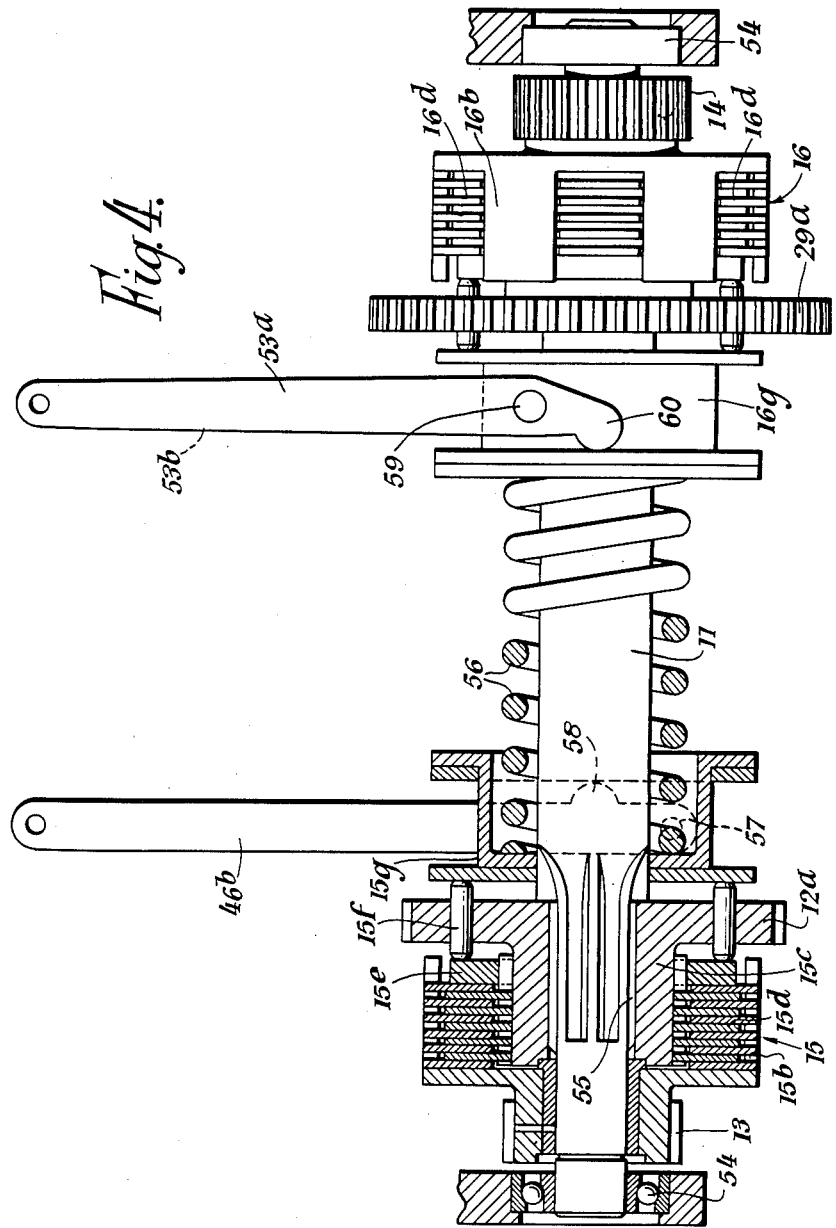

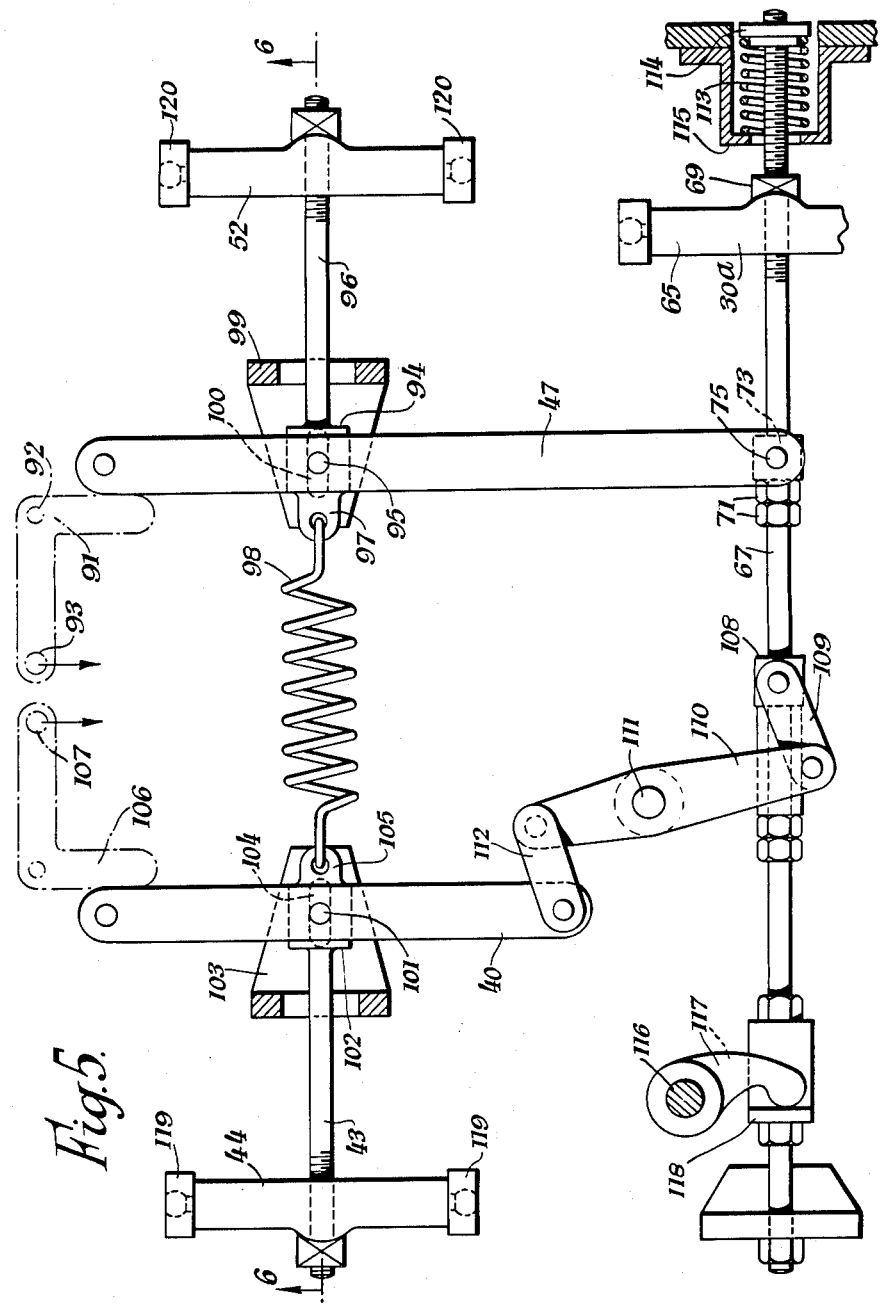

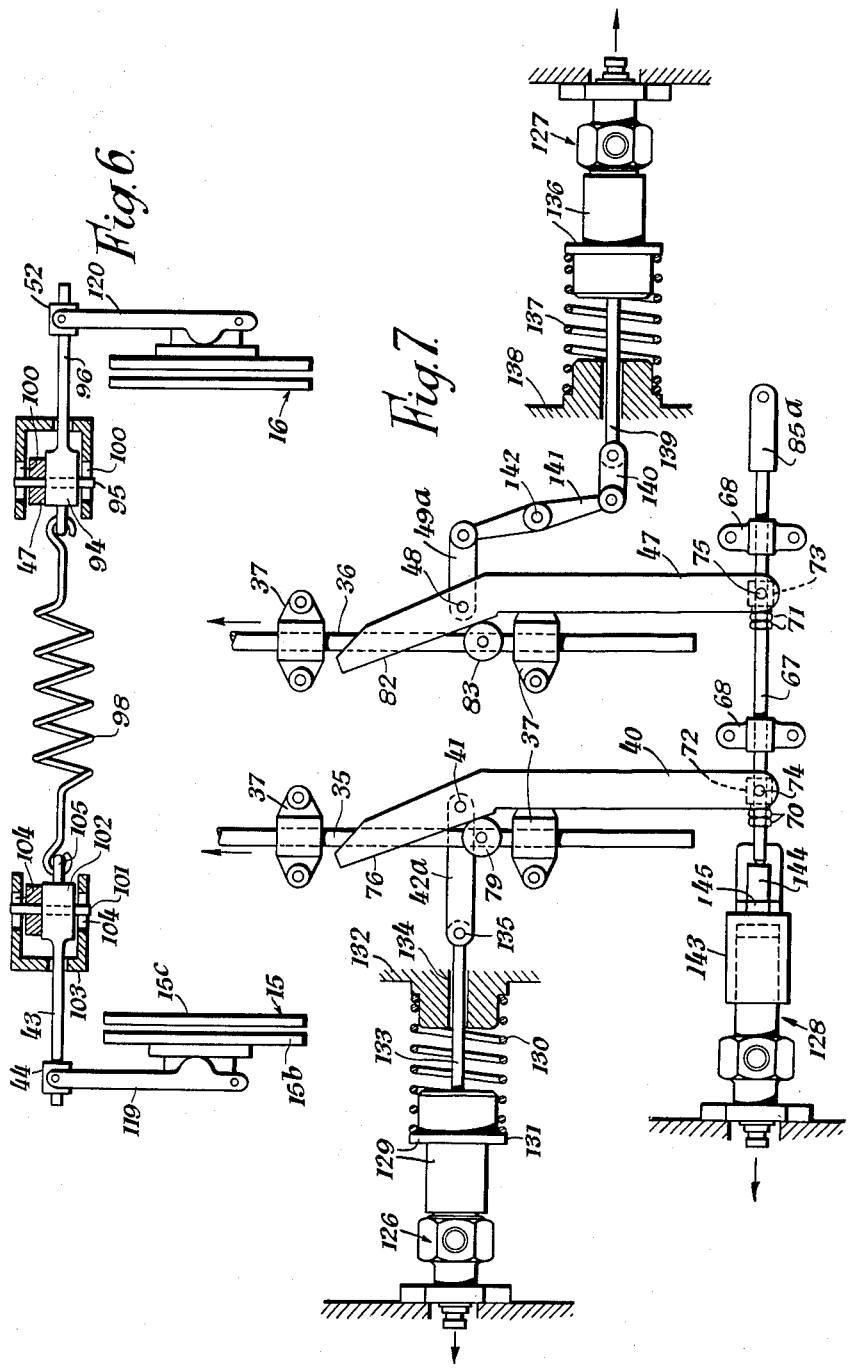

United States Patent Office 2,749,774
Patented June 12, 1956

2,749,774

CONTROLLING SYSTEM FOR CLUTCH-OPERATED VEHICLE STEERING MECHANISM

Geoffrey Robert Greenbergh Gates, Leamington Spa, England

Application June 27, 1952, Serial No. 295,923

Claims priority, application Great Britain July 4, 1951

13 Claims. (Cl. 74—710.5)

This invention relates to clutch-operated vehicle steering mechanism and more particularly to controlling means therefor. The invention is especially intended for use with combined driving and steering systems in which steering to turn the vehicle is carried out by disengaging a main clutch and substantially simultaneously engaging a steering clutch. A system of this form employing two main clutches and one steering clutch is described in my U. S. specifications Nos. 2,353,554 dated 11th July, 1944 and 2,389,498 dated 20th November, 1945. In this system the drive from the engine is taken through the two normally-engaged main clutches respectively to a pair of driving wheels, and it is also taken through a normally-disengaged steering clutch to the casing of a differential gear, the other two elements of which are permanently coupled to the driving wheels; the system incorporates gearing so that normally (i. e. during straight travel) the elements of the steering clutch have relative rotation. By disengaging one of the main clutches and engaging the steering clutch, the corresponding wheel is driven through the differential gear at a reduced speed causing the vehicle to turn.

It is the object of the invention to provide an improved form and construction of control means which enables the main and steering clutches to be manipulated with precision so as to obtain accurate and smooth regulation of the steering movements of the vehicle.

A further object is to provide an improved controlling system which is very compact, and is readily adaptable to suit wide variations in vehicle design. In a control system for a clutch-operated steering mechanism, having a main clutch which is normally engaged by the action of spring pressure, and a steering clutch which is normally disengaged, the invention is characterised by the fact that said system comprises a lever device which is connected to the releasing means of the main clutch, and which when operated to release the main clutch transfers the spring force from said main clutch engaging means on to the steering clutch engaging means to engage the steering clutch.

Moreover, in a control system for a clutch-operated steering mechanism having a pair of main clutches which for normal straight running are both engaged, and a steering clutch which is normally disengaged, according to the invention, a lever device, which is operated to remove the engagement pressure progressively from either one of the main clutches, is mounted so that its reaction force acts upon the engaging means of the steering clutch to bring said steering clutch progressively into engagement as either one of the main clutches is disengaged. Preferably each main clutch has a separate lever for disengaging it, and both of said levers are connected to the steering clutch so that operation of either lever engages the steering clutch. The system may comprise a left-turning lever and a right-turning lever, actuating means arranged to move said levers angularly, one for turning to the left and the other for turning to the right, each lever being connected to its corresponding main clutch to release the latter, and both of said levers being connected to the steering clutch so as to impart thereto a reaction force derived from the release of either of the main clutches. Preferably the actuating means comprises for each of said levers a cam surface upon said lever and an actuating member which co-operates with said cam surface but is constrained to move along a path inclined to the cam surface, whereby said movement of the actuating member causes the lever to be deflected by means of the cam surface.

The invention is illustrated by way of example in the accompanying drawings, in which:

Figure 1 is a diagrammatic plan of the form of steering mechanism for which the invention is primarily intended;

Figure 2 is a plan of one control system;

Figure 3 is a fragmentary sectional elevation taken on the line 3—3 of Figure 2;

Figure 4 is a diagrammatic elevation to show the manner in which the driving clutches are arranged and controlled in the system of Figure 2;

Figure 5 is a plan of a modified construction of control system;

Figure 6 is a diagrammatic sectional elevation taken on the line 6—6 of Figure 5; and Figure 7 is a plan of another control system for operating control valves where the clutches are engaged by fluid pressure.

The steering mechanism shown in Figure 1 is arranged to operate in the manner described in said U. S. specification No. 2,353,554 and includes driving means 10, such as the usual change-speed gear box of a vehicle, connected to a main transverse shaft 11 by bevel gearing 12. At opposite ends the main shaft 11 is connected to main pinions 13, 14 by corresponding main clutches 15, 16, these being of usual construction, arranged to be engaged normally by spring pressure, and having releasing means adapted to remove the spring force so as to allow the clutch elements to rotate freely relative to one another. A coaxial pair of vehicle wheels are shown at 17, 18 and are mounted upon corresponding output shafts 19, 20 driven by large gear wheels 21, 22 meshing respectively with the main shaft pinions 13, 14. The output shafts 19, 20 extend into a differential unit 23 where they are fitted with bevel gears 24, 25 forming the first and second elements respectively of said differential unit; the third element is constituted by bevel gears 26 mounted upon a carrier 27 freely rotatable upon the shaft 20. Also mounted on said shaft so as to be freely rotatable is a gear wheel 28 which meshes with a pinion 29 fast on the main shaft 11, the diameters being arranged so that the gear wheel 28 revolves at a somewhat slower rate than the gear wheels 21, 22. A steering clutch 30 is fitted between the gear wheel 28 and the differential casing 27; this steering clutch is also of the normal construction, except that it is normally disengaged by its springs, actuation of its operating means serving to overcome the springs and force the clutch elements into driving engagement with one another.

The present invention is concerned with the means for actuating the two main clutches 15, 16 and the steering clutch 30 so as to produce the following action. For normal straight running both main clutches 15, 16 are engaged and the steering clutch 30 left disengaged, so that the wheels 17, 18 are rotated at equal speeds through the main clutches 15, 16 and the corresponding sets of gears 13, 21 and 14, 22. The differential casing 27 turns at the same speed as the output shafts 19, 20 and the gear 28 rotates idly at a somewhat slower speed. To turn, say to the left, the main clutch 15 is disengaged (thus cutting off the main drive to the wheel 17) and the steering clutch 30 is engaged. Thus the differential casing 27 is positively driven at a somewhat slower speed than the output shaft 20 of the right-hand wheel, so that the bevel wheel 24 and left-hand wheel 17 are positively driven at a still slower speed. As a result, the vehicle turns to the left, for the right-hand wheel 18 is still turning at its original speed (assuming the speed of the main shaft 11 to remain constant). To turn to the right, it is necessary to disengage the main clutch 16 and engage the steering clutch 30, thus causing the differential unit 23 to drive the wheel 18 at a reduced speed. It will be apparent that in order to produce a smooth drive it is important that the steering clutch 30 should be engaged gently and progressively after the main clutch 15 or 16 is disengaged. Moreover by closely inter-relating the operation of the main and steering clutches a turn of any radius (more than a predetermined minimum) can be made, the turns of larger radius being obtained by disengaging the main clutch fully but only partially engaging the steering clutch.

One construction of control system is shown in Figures 2 to 4. The vehicle is provided with a pair of longitudinally extending steering rods, namely a left-hand steering rod 35 and a right-hand steering rod 36, these being slidably mounted in fixed brackets 37. They are fitted with any convenient operating means (not shown) such, for instance, as a pair of steering levers or a steering wheel, the arrangement being such that for steering to the left the rod 35 is moved forwards, as indicated by the arrow 38; similarly to turn the vehicle to the right, the steering rod 36 is moved forwards as indicated by the arrow 39. Disposed alongside the rod 35 is a left-turn lever 40 which for convenience in manufacture comprises a pair of twin members 40a and 40b as shown in Figure 3. These are pivoted by means of a pin 41 to a substantially C-shaped member 42 to which a tension rod 43 is attached, said rod serving to operate the left-hand main clutch, the upper part of the disengaging mechanism of which is shown at 15a in Figure 2. This mechanism comprises a cross bar 44 which is operatively coupled to the tension rod 43 by an adjusting nut 45. The ends of the cross bar 44 are connected by ball and socket joints to twin releasing levers 46a, 46b extending downwards to the corresponding main clutch 15. In a similar manner a right-turn lever 47 is disposed alongside the steering rod 36 and is pivoted by a pin 48 to a bifurcated member 49 and a push rod 50 by which the releasing mechanism 16a of the right-hand main clutch 16 is actuated. Thus the push rod 50 is provided with an adjusting nut 51 which presses against a cross bar 52 connected at its ends to a pair of twin releasing levers 53a, 53b.

The arrangement of the two main clutches 15 and 16 is shown in Figure 4. The main shaft 11 is mounted at its ends in bearings 54 and it has the main pinions 13 and 14 mounted to run freely upon it. The pinion 13 is formed integrally with the driven element 15b of the clutch 15, while the driving element is in the form of a sleeve 15c splined upon the main shaft 11, as indicated at 55. The driving element 15c of the left-hand main clutch 15 is formed integrally with a gear wheel 12a which constitutes the main drive from the engine to the main shaft 11. The driven and driving elements 15b, 15c are normally connected together by a set of annular clutch plates 15b, as is well known in the art, and these are arranged to be pressed into driving engagement by an annular pressure member 15e which is actuated by a circumferential series of push rods 15f mounted in holes bored in the gear wheel 12a. At their right-hand ends the push rods 15f are engaged by a spool-shaped control member 15g which is slidable axially upon the main shaft 11 and is normally pressed firmly to the left to engage the main clutch 15 owing to the action of a heavy coiled compression spring 56 surrounding the central part of the main shaft 11. The right-hand main clutch 16 is of similar construction, its control member 16g being urged to the right by the adjacent end of the said coiled compression spring 56 so that the same spring acts to engage both clutches. A gear wheel 29a forming part of the driving element of the clutch 16 is provided for imparting the necessary drive to the steering clutch 30 (Figure 1) and the differential unit 23. The release levers 46a and 46b extend downwards on opposite sides of the control member 15g and are pivoted to a suitably fixed bracket (not shown) at a fulcrum 57 disposed a short distance below the axis of the main shaft 11; each of the levers 46a, 46b has a projection 58 on a lever with its axis adatped to press the control member 15g to the right and thus cause said member to remove the force of the spring 56 from the plates 15d of the main clutch 15. This action occurs, of course, when the tension rod 43 (Figure 2) is moved to the right. The mechanism is arranged so that the release levers 53a, 53b also have to be moved to the right when it is desired to release the main clutch 16, and this effect is obtained by mounting said levers so that their fulcrum 59 is disposed a short distance above the axis of the main shaft 11, each lever being provided with a projection 60 adapted to press the control member 16g leftwards when the release levers 53a, 53b are moved to the right. In Figure 4, 16b is the driven element of the main clutch 16, while the plates are indicated at 16d.

In order to control the steering clutch, engaging means 30a (Figure 2) are provided comprising a cross bar 65 connected at its ends to twin engaging levers 66a, 66b, the lower ends of these, of course, being connected to the control member (not shown) of the steering clutch so that movement of the cross bar 65 is effected by a transverse rod 67 mounted slidably in brackets 68 and having an adjusting nut 69 by which force is applied to the cross bar 65. The rod 67 is also fitted with two pairs of nuts 70 and 71 constituting adjustable collars on the rod for engagement respectively with blocks 72, 73 which are axially slidable therein. The block 72 is pivotally attached at 74 to the rear end of the lever 40 while the block 73 is similarly attached at 75 to the rear end of the lever 47. Thus the two levers 40 and 47 are floating.

At its forward end the lever 40 is shaped so that each of its component parts 40a and 40b has a straight cam surface 76 extending obliquely from a position 77 well forward of the pivot pin 41 to a position 78 a short distance to the rear thereof. These cam surfaces are engaged respectively by a pair of actuator rollers 79a, 79b (Figure 3) which are mounted one above and one below the steering rod 35 by means of a block 80 secured to said rod. It will be noted that when the steering rod 35 is in its normal straight-ahead position, the rollers which are indicated generally at 79 in Figure 2, are disposed just behind the pivot pin 41, the lever 40 resting against a stop surface 81 on one of the brackets 37. The cam surface 76, moreover, is arranged obliquely so as to extend across the steering rod 35 whereby a forward movement of the rod 35 with the actuating roller 79 causes the lever 40 to be displaced towards the right, as will be explained more fully hereinafter. The right-turn lever 47 is constructed in a manner similar to the left-turn lever 40 and it has a cam surface 82 which is arranged obliquely with respect to the steering rod 36 and in the same sense as the cam surface 76. It is engaged by an actuating roller device 83 mounted upon the steering rod 36 so that forward movement of said steering rod again moves the lever 47 to the right, said lever in its normal position resting against a stop surface 84.

When the vehicle is running straight ahead, the parts lie in the position shown in Figure 2, the levers 40 and 47 resting against the bottom stops 81 and 84 and the steering rods 35 and 36 being in their rearward positions with the rollers 79, 83 lying just clear of the rear ends of the cam surfaces 76, 82; the nuts 45, 51 are adjusted so that the main clutches 15 and 16 are fully engaged, while the nut 69 is adjusted so that the steering clutch 30 is fully disengaged. If it is desired to turn to the left, the steering wheel or equivalent pulls the steering rod 35 forwards in its guides 37, the roller 79 thus being drawn forwards along the axis of said rod 35. The roller 79 therefore presses the lever 40 to the right owing to the action of the cam surface 76, and in doing so the pin 41 progressively receives the force of the clutch-engaging spring 56 as the main clutch 15 is correspondingly disengaged; by the time that the clutch is fully disengaged the whole force of the spring 56 is being borne by the pivot pin 41. It will be seen that during the initial part of the roller travel, said roller 79 acts upon the lever 40 at a position behind the pivot pin 41 so that the force of the clutch spring 56 acting upon the pivot pin 41 exerts a weak anti-clockwise couple upon the lever 40 and thus has no tendency to engage the steering clutch. As the rod 35 is pulled forwards, however, it passes the pivot pin 41, thus reversing the direction of this couple and tending to cause the rear end of the lever 40 to press upon the nut 70; the rod 67 is moved to the left and the steering clutch 30 commences to be engaged. It will be noted that as the roller 79 moves further forward, not only does the spring force on the pivot pin 41 increase, but also the leverage ratio progressively changes so as to exert on the rod 67 an increasing proportion of the spring force which is transferred to the pivot pin 41. In effect, the force of the clutch spring 56 is progressively removed from the main clutch 15 and a fraction of this removed spring force is transferred to the rod 67 for engaging the steering clutch; this fraction progressively increases in value as the main clutch approaches its fully released position. The mechanism is preferably arranged so that the main clutch 15 becomes fully disengaged as the roller 79 becomes level with the pivot 41. The movement of the lever 40 towards the right, of course, carries said lever away from the abutment stop 81 and therefore enables the full reaction force at the rear end of said lever to be transferred to the rod 67 by way of the nuts 70.

In order to make the vehicle turn to the right the steering rod 36 is pulled forwards and this has the same effect upon the lever 47, the cam surface 82 causing said lever to be shifted to the right and to receive more and more of the force from the right-hand end of the clutch spring 56, which force is normally used to engage the main clutch 16. Once again the reaction at the rear end of the lever 47 urges the rod 67 to the left to engage the steering clutch 30. A fitting 85 is provided on the end of the rod 67 for connection to a brake pedal or lever shown diagrammatically at 85a, for by simply pulling upon the rod 67 to engage the steering clutch 30 while both of the main clutches 15 and 16 are engaged, the system becomes locked and the clutch system operates efficiently as a friction brake. Thus by reference to Figure 1 it will be seen that the main clutches 15, 16 (which are engaged) rigidly connect together the three pinions 13, 29 and 14. The road wheels 17, 18 are therefore obliged to turn in unison (i. e. to the same amount and at the same speed) for the gearing 13, 21 is identical with the gearing 14, 22. Therefore the casing 27 of the differential gear unit 23 must also rotate as one with the road wheels 17, 18. Now the pinion 29 is much smaller than (say only half) the diameter of the pinions 13, 14, so that the gear wheel 28 will rotate about twice the speed of the gear wheels 21, 22, i. e. about twice the speed of the differential casing 23. By engaging the steering clutch 30, therefore, the gearing system 13, 21; 29, 28; 14, 22 is locked up or rendered non-rotatable. If the vehicle is moving when the steering clutch 30 is thus engaged, this clutch will slip and act as a brake until the system comes to a standstill. During straight travel with both main clutches engaged, the levers 40 and 47 are floating, so that they do not restrict the inevitable "take-up" as the clutches wear.

A somewhat similar form of lever is shown in Figures 5 and 6, the general arrangement being simpler than the previous example. The cross bar 65 belonging to the operating mechanism 30a of the steering clutch is connected as before to a transverse rod 67 having a slidable block 73 upon which the rear end of the right turn lever 47 is pivotally mounted, said block being operated by nuts 71. At its forward end the lever 47 is arranged to be moved to the right by the steering wheel or other steering arrangement; in Figure 5 this is shown diagrammatically as a bell-crank lever 91 which is pivotally mounted at 92 and has a handle 93 which is pulled rearwards to make the vehicle turn to the right, the rearwardly-directed limb of the bell-crank lever bearing outwards against the front of the lever 47. A block 94 is pivoted to the lever 47 by means of a pin 95, said block being connected by a tension rod 96 to the cross bar 52 of the main clutch 16, said clutch being released by movement of the tension rod 96 towards the left. The block 94 is formed with an eye 97 to which one end of a coiled tension spring 98 is attached. Also the block 94 and the lever 47 are encompassed by a U-shaped bracket 99 secured to a fixed part of the vehicle. The upper and lower limbs of this bracket are formed with slots 100 through which the pivot pin 95 passes, as is shown in Figure 6. The left-turn lever 40 is mounted in a similar manner by means of a pivot pin 101 connecting it to a block 102, both being slidable between the limbs of a bracket 103 and the sliding movement being limited by the engagement of the pin 101 in slots 104. The block 102 is connected to the opposite end of the coiled tension spring 98 by means of an eye 105 and it is also coupled to the cross bar 44 of the main clutch 15 by means of a tension rod 43. Again the lever 40 is operated by any suitable steering means such, for instance as a bell-crank lever 106 having a handle 107 and arranged to press the front end of the lever 40 to the left when it is desired to steer the vehicle to the left. A block 108 freely slidable upon the rod 67, is connected to the rear end of the lever 40 by means of motion-reversing mechanism, comprising a rear link 109, a rocking lever 110 having a fixed fulcrum pin 111 and a front link 112. Thus, movement of the rear end of the lever 40 to the right moves the rod 67 to the left and acts to engage the steering clutch. To compensate for the fact that the lever 40 is shorter than the lever 47, the reversing lever 110 has arms of unequal length.

In this example it is the spring 98 which is used to apply both of the main clutches 15 and 16, said spring acting through the tension rods 43 and 96, as shown in Figure 6. Thus, in the case of the main clutch 15 the driven element 15b is pressed against the driving element 15c by a pair of levers 119 which are connected together at their upper ends by the cross bar 44. The force in the tension rod 43 pulls the levers 119 to the right and thus engages the clutch; conversely, the removal of the force from the tension rod 43 allows the driven element 15b to be slackened with the result that the clutch is released. Similarly the main clutch 16 has a pair of levers 120 which are connected to the cross bar 52 and bring about engagement of the clutch 16 to an extent corresponding to the tension in the rod 96. Either one of the clutches 15 and 16 is therefore released by taking away the spring force from the corresponding rod 43 or 96, said force being transferred to whichever of the levers 40 or 47 is actuated. Thus, if the vehicle is required to turn to the right, the handle 93 is pulled rearwards and the bell-crank lever 91 causes the front end of the lever 47 to be pushed to the right. It will be seen that this movement of the forward end of the lever 47 to the right forces the pivot pin 95 to transfer some of the force of the spring 98 from the tension member 96 to the lever 47, the tension rod 96 being progressively pushed to the right to release the main clutch 16. The transference of the spring force to the pivot pin 95 of the lever 47 produces at the rear end of said lever a reaction force tending to move the rod 67 to the left and thus engage the steering clutch 30, and this reaction force builds up progressively as the forward end of the lever 47 is moved further to the right. It will be seen therefore that as the main clutch 16 is progressively released by removal of spring force therefrom, this spring force is transferred by the lever 47 and acts upon the steering clutch 30 to effect engagement. After a predetermined angular movement to the lever 47, the pivot pin 95 engages positively with the right-hand end of the slots 100 and thereafter the lever 47 acts as a simple lever of the first order, said lever acting to transfer force from the bell-crank lever 91 to the rod 67. For a turn to the left, the lever 40 operates in a similar manner to transfer the spring force from the tension rod 43 of the main clutch 15 to the rod 67 in such a way as to move rod 67 to the right.

It has been found to be advantageous to be able to control the manner in which the steering clutch is engaged and for this purpose a coiled compression spring 113 is fitted upon the rod 67 so as to act between an adjusting nut 114 on said rod and an abutment member 115 secured to a fixed part of a vehicle. The spring 113 acts to pull the rod 67 to the right and thus resist the engagement of the steering clutch 30, the extent of this resistance being adjustable by means of the nut 114. Therefore the responsiveness of the steering clutch can be easily adjusted to suit different vehicles and different driving conditions.

A shaft 116 is provided with a pair of twin arms 117 which straddle the rod 67 and engage a flange 118 thereon. Thus, turning the shaft 116 in a clockwise direction causes the rod 67 to be moved to the left to engage the steering clutch, while the main clutches 15 and 16 are both engaged, with the result that the vehicle is braked.

The system shown in Figure 7 is substantially the same as that in Figures 2 to 4 but is arranged for use in connection with heavier vehicles where the main and driving clutches are operated by fluid pressure such, for instance, as by the pressure of oil developed by a pump driven by a part of the transmission which runs as long as the engine and/or the vehicle runs. It will be realised that the engagement pressure of the clutches in these circumstances is produced by the pressure intensity of the liquid supplied to the usual hydraulic cylinders of the clutches themselves and is not derived primarily from springs incorporated in the clutches. To operate clutches of this liquid-pressure kind it is usual to provide a pressure-regulating valve between the source of pressure liquid and the clutch itself. In the present example pressure regulating valves of the well-known reaction type are used, and are provided with a slidable operating member to which external force is applied, the pressure of the liquid delivered by the valve being proportional to the external force applied to said operating member.

Referring to Figure 7, the left-hand main clutch (15 in Figure 1) is operated by pressure liquid fed through a control valve, as indicated at 126, while the corresponding control valve for the right-hand main clutch is shown at 127. The steering clutch (30 in Figure 1) is operated by pressure liquid delivered from a third pressure regulating valve 128. In orer to work these valves, lever mechanism similar to that shown in Figures 2 and 3 is provided and where possible similar reference numerals have been used to show corresponding parts. The left-turn lever 40 has an oblique cam surface 76 which co-operates with roller 79 to deflect the lever 40 to the right as the left-hand steering rod 35 is moved forwards. The pressure regulating valve 126 has a cap member 129 which is axially slidable to control the pressure delivered by said valve 126; the cap member 129 is shown in its extreme left-hand position corresponding to the delivery of liquid at maximum pressure to the corresponding driving clutch 15. The cap member 129 is normally held in this position against the force of the pressure liquid in the valve, by a coiled compression spring 130 which bears at one end against a flange 131 on the cap member 129, while its other end bears against an abutment member 132 fixed on a convenient part of the vehicle. A tension rod 133 is attached to the cap member 129 and extends freely through a bore 134 in the abutment member 132, its right-hand end being pivotally connected at 135 to the link member 42a; the right-hand end of this link member is, of course, pivoted by the pin 41 to the lever 40. When the steering rod 35 is in its rearmost position, as shown in Figure 7, the whole force of the spring 130 is exerted upon the cap member 129 and therefore the corresponding main clutch 15 is engaged to its fullest extent. On the other hand, as the rod 35 is moved forwards the lever 40 is shifted to the right so that the force of the spring 130 is progressively transferred to the tension member 133, and as the cap member 129 is relieved of spring pressure, said cap member correspondingly moves to the right, and therefore reduces the pressure of the liquid delivered by the valve 126 with the result that the clutch 15 is disengaged.

For operating the right-hand main clutch (16 in Figure 1), the pressure regulating valve 127 is similarly provided with a cap member 136 which is urged to the right by a coiled compression spring 137 bearing against an abutment member 138. The cap member 136 is connected by a tension rod 139 to a link 140, this being coupled by a rocking, motion-reversing lever 141 to the link member 49a which is operated by the right-turn lever 47, the reversing lever 141 being, of course, pivoted to a fixed part of the vehicle at 142. Thus, movement of the lever 47 to the right under the action of the roller 83 and the cam surface 82 causes tension to be applied to the tension rod 139, which tension appears as thrust in the link 49a.

The pressure regulating valve 128 which is used to operate the steering clutch (30 in Figure 1) has a cap member 143 which is shown in its fully-retracted position in Figure 7 and has a spigot 144 projecting slidably through a fixed stop member 145. The end of the spigot 144 is in thrust-transmitting engagement with the rod 67 which, as before, is slidable in brackets 68 and carries adjustable collars 70 and 71 conveniently composed of nuts. These normally engage freely slidable blocks 72, 73 which are pivotally attached to the levers 40 and 47 respectively by pivot pins 74, 75. A connection 85a is intended to be coupled to a brake-applying lever or other device (not shown) by which the rod 67 can be pushed to the left independently of the levers 40, 47, so as to open the valve 128 and thus engage the steering clutch 30 while both main clutches 15, 16 are fully engaged, thus producing a powerful braking action on the vehicle.

It will be apparent that when the system shown in Figure 7 is used for steering, operation of either of the steering rods 35 or 36 causes the corresponding lever 40 or 47 to be deflected to the right, and once the roller 79 or 83 has passed the line of action of the corresponding link member 42a or 49a, the reaction force at the pivot 74 or 75 acts upon the corresponding collar 70 or 71 so as to push the rod 67 towards the left, and thus actuate the valve 128; the pressure delivered by the valve 128 to the steering clutch is, of course, proportional to the force in the rod 67, so that as the main clutch 15 or 16 is relieved of pressure liquid in order to release said clutch, the force of the corresponding compression spring 130 or 137 is transferred to the lever 40 or 47 and thence appears as reaction at 74 or 75, which reaction is used to build up fluid pressure and apply the steering clutch.

It is to be noted that in all the above-described arrangements the vehicle can be caused to advance straight (but in a lower gear than normal) by moving both steering rods to an equal extent, thus releasing both main clutches and engaging the steering clutch.

The improved controlling system may be used for those of the tracklaying and/or wheeled types, including those in which road wheels at each side are coupled together so that their tires act conjointly and produce a driving action substantially similar to that of endless tracks.

I claim:

1. A driving and steering mechanism comprising a driven main shaft, two output shafts, two normally engaged main clutches connecting the main shaft with the respective output shafts, a differential gear unit having first, second and third elements, a pair of steering shaft sections connecting the output shafts to said first and second elements, respectively, a normally disengaged steering clutch connected to the third element of the differential gear unit, and a control system for simultaneously operating either main clutch and the steering clutch for bringing about differential rotation of the output shafts, said control system comprising spring means for holding each main clutch engaged, releasing means for each main clutch, a lever device connected to the releasing means of each main clutch and operatively connected to the engaging means of the steering clutch whereby movement of said lever causes spring force from either main clutch to be transferred through said lever to the steering clutch to bring about engagement thereof.

2. A driving and steering mechanism comprising a driven main shaft, two output shafts, two normally engaged main clutches connecting the main shaft with the respective output shafts, a differential gear unit having first, second and third elements, a pair of steering shaft sections connecting the output shafts to said first and second elements respectively, a normally disengaged steering clutch connected to the third element of the differential gear unit, and a control system for simultaneously operating either main clutch and the steering clutch for bringing about differential rotation of the output shafts, said control system comprising releasing means for each main clutch, engaging means for the steering clutch, a lever which is free to float and has a first pivotal connection to the releasing means of said main clutch, a second pivotal connection to the engaging means of the steering clutch, said first and second pivotal connections being spaced longitudinally of the lever, and actuating means which act upon the lever at a position spaced from the first and second pivotal connections in the direction to disengage the said main clutch, the lever reacting at the second pivotal connection upon the engaging means of the steering clutch.

3. A driving and steering mechanism comprising a driven main shaft, two output shafts, two normally engaged main clutches connecting the main shaft with the respective output shafts, a differential gear unit having first, second and third elements, a pair of steering shaft sections connecting the output shafts to said first and second elements respectively, a normally disengaged steering clutch connected to the third element of the differential gear unit, and a control system for simultaneously operating either main clutch and the steering clutch for bringing about differential rotation of the output shafts, said control system comprising releasing means for each main clutch, engaging means for the steering clutch, a pair of levers corresponding respectively to the main clutches, each lever being free to float and having a first pivotal connection to the releasing means of said main clutch, a second pivotal connection to the engaging means of the steering clutch, said first and second pivotal connections being spaced longitudinally of the lever, and actuating means which act upon the lever at a position spaced from the first and second pivotal connections in the direction to disengage the said main clutch, the lever reacting at the second pivotal connection upon the engaging means of the steering clutch.

4. A mechanism according to claim 3, in which both floating levers are connected to a single steering clutch so that operation of either lever engages said steering clutch.

5. A driving and steering mechanism comprising a driven main shaft, two output shafts, two normally engaged main clutches connecting the main shaft with the respective output shafts, a differential gear unit having first, second and third elements, a pair of steering shaft sections connecting the output shafts to said first and second elements respectively, a normally disengaged steering clutch connected to the third elements of the differential gear unit, and a control system for simultaneously operating either main clutch and the steering clutch for bringing about differential rotation of the output shafts, said control system comprising releasing means for each main clutch, engaging means for the steering clutch, a pair of levers corresponding respectively to the main clutches, each lever being free to float and having a first pivotal connection to the releasing means of said main clutch, a second pivotal connection to the engaging means of the steering clutch, said first and second pivotal connections being spaced longitudinally of the lever, and actuating means which is slidable along said lever whereby its leverage changes as the main clutch is disengaged.

6. A driving and steering mechanism comprising a driven main shaft, two output shafts, two normally engaged main clutches connecting the main shaft with the respective output shafts, a differential gear unit having first, second and third elements, a pair of steering shaft sections connecting the output shafts to said first and second elements respectively, a normally disengaged steering clutch connected to the third element of the differential gear unit, and a control system for simultaneously operating either main clutch and the steering clutch for bringing about differential rotation of the output shafts, said control system comprising releasing means for each main clutch, engaging means for the steering clutch, a pair of levers corresponding respectively to the main clutches, each lever being free to float and having a first pivotal connection to the releasing means of said main clutch, a second pivotal connection to the engaging means of the steering clutch, said first and second pivotal connections being spaced longitudinally of the lever, a cam surface on the lever, a follower member engaging said cam surface, and actuating means for moving said follower member so that it presses against the cam surface and thereby shifts the lever to disengage the main clutch.

7. A mechanism according to claim 6, having constraining means guiding the follower along a fixed path inclined to the cam surface.

8. A mechanism according to claim 7, in which each lever is operatively connected only to the releasing means of the corresponding main clutch, to the engaging means of the steering clutch and to the actuating means.

9. A mechanism according to claim 6, wherein the following member, during its movement along the cam surface, passes the first pivotal connection where said lever is connected to the main clutch, said follower member thereby reversing the direction of the reaction force exerted upon the engaging means of the steering clutch by said lever.

10. Mechanism according to claim 3, having thrust-transmitting means connecting each lever to the engaging means of the steering clutch, whereby actuation of either one of said levers leaves the other lever unaffected.

11. A driving and steering mechanism comprising a driven main shaft, two output shafts, two normally engaged main clutches connecting the main shaft with the respective output shafts, a differential gear unit having first, second and third elements, a pair of steering shaft sections connecting the output shafts to said first and second elements respectively, a normally disengaged steering clutch connected to the third element of the differential gear unit, and a control system for simultaneously operating either main clutch and the steering clutch for bringing about differential rotation of the output shafts, said control system comprising fluid-pressure releasing means for each main clutch, a pair of pressure-regulating control valves for said releasing means, fluid-pressure engaging means for the steering clutch, a pressure-regulating control valve for said engaging means, a pair of levers corresponding respectively to the main clutches, each lever being free to float and having a first pivotal connection to the control valve of the corresponding main clutch, a second pivotal connection to the control valve of the steering clutch, said first and second pivotal connections being spaced longitudinally of the lever, and actuating means which act upon the lever at a position spaced from the first and second pivotal connections in the direction to disengage the said main clutch, the lever reacting at the second pivotal connection upon the engaging means of the steering clutch.

12. Mechanism according to claim 11, wherein the pressure-regulating control valve of the steering clutch receives the reaction force from whichever floating lever is actuated, and feeds pressure fluid to the engaging means of the steering clutch at a pressure, the intensity of which corresponds to the strength of said reaction force.

13. Mechanism according to claim 1, having auxiliary control means on the steering clutch to apply said clutch independently of the lever device of the main clutches, thereby braking both the output shafts.

References Cited in the file of this patent

UNITED STATES PATENTS

| | | |
|---|---|---|
| 728,420 | Desimone | May 19, 1903 |
| 1,429,280 | Godfrey | Sept. 19, 1922 |
| 1,470,078 | Hallworth | Oct. 9, 1923 |
| 1,880,344 | Franco | Oct. 4, 1932 |
| 2,261,432 | Cooke | Nov. 4, 1941 |
| 2,353,554 | Gates | July 11, 1944 |
| 2,389,498 | Gates | Nov. 20, 1945 |
| 2,586,220 | Gerst | Feb. 19, 1952 |

FOREIGN PATENTS

| | | |
|---|---|---|
| 602,318 | Great Britain | May 25, 1948 |
| 920,419 | France | Jan. 4, 1947 |